T. B. WYLIE.
PROPORTIONAL METER.
APPLICATION FILED DEC. 16, 1912.

1,076,855.

Patented Oct. 28, 1913.

2 SHEETS—SHEET 1.

WITNESSES
R. A. Balderson

INVENTOR
T. B. Wylie
by Bakewell, Byrnes & Parmelee,
Attys.

T. B. WYLIE.
PROPORTIONAL METER.
APPLICATION FILED DEC. 16, 1912.

1,076,855.

Patented Oct. 28, 1913.
2 SHEETS—SHEET 2.

WITNESSES

INVENTOR

UNITED STATES PATENT OFFICE.

THOMAS B. WYLIE, OF PITTSBURGH, PENNSYLVANIA, ASSIGNOR TO EQUITABLE METER COMPANY, OF PITTSBURGH, PENNSYLVANIA, A CORPORATION OF PENNSYLVANIA.

PROPORTIONAL METER.

1,076,855.      Specification of Letters Patent.      Patented Oct. 28, 1913.

Application filed December 16, 1912. Serial No. 736,943.

*To all whom it may concern:*

Be it known that I, THOMAS B. WYLIE, a resident of Pittsburgh, in the county of Allegheny and State of Pennsylvania, have invented a new and useful Improvement in Proportional Meters, of which the following is a full, clear, and exact description, reference being had to the accompanying drawings, forming part of this specification, in which—

Figure 1:
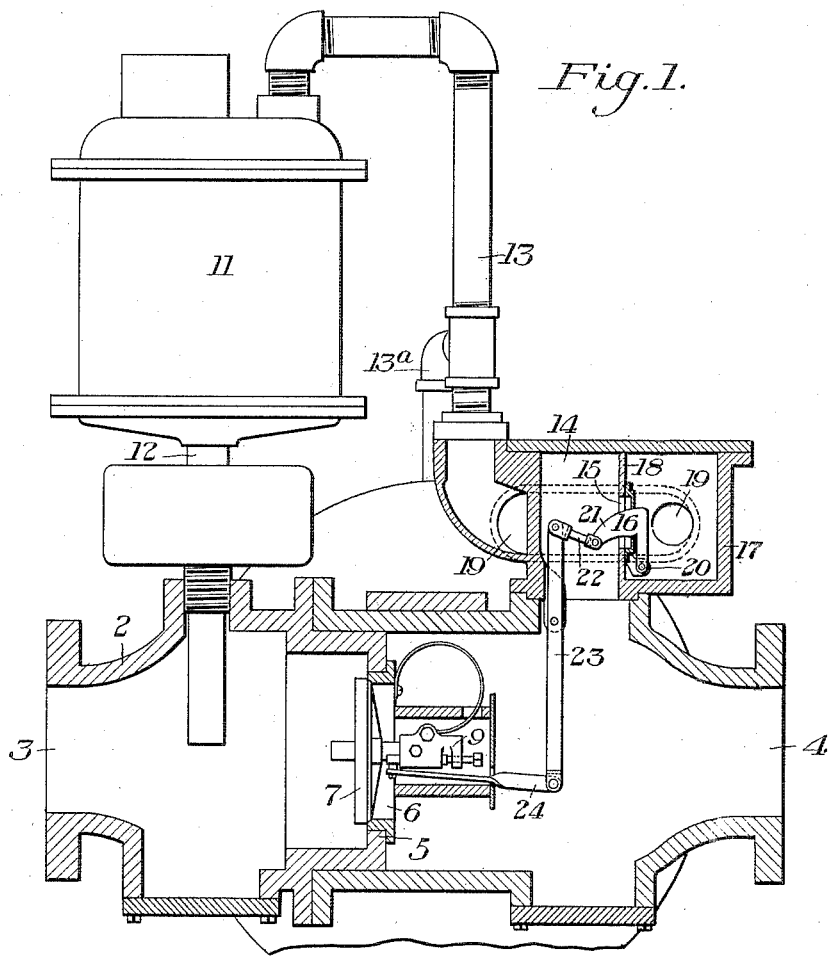
Figure 2:
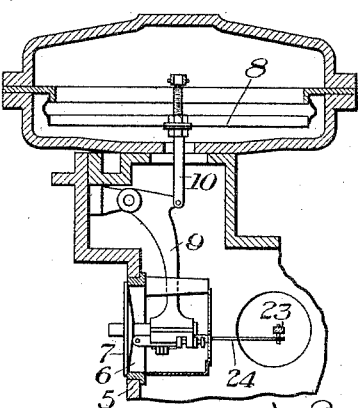
Figure 3:
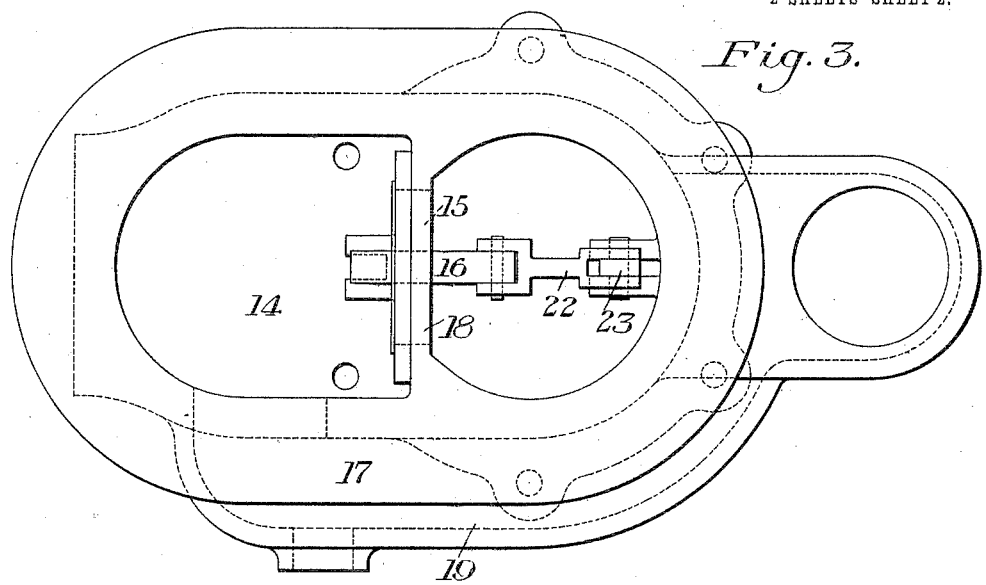
Figure 4:
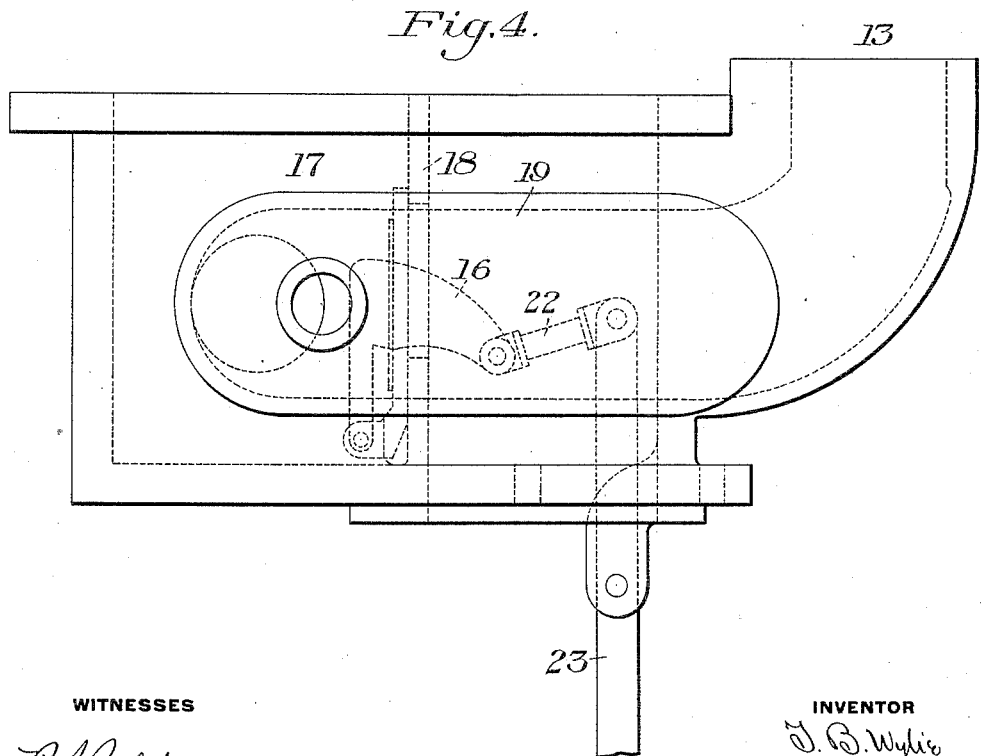

Figure 1 is a view partly in elevation and partly in vertical section of a meter embodying my invention; Fig. 2 is a horizontal section showing the connection between the high and low pressure plates; Fig. 3 is a plan view of a portion of the meter; and Fig. 4 is a side view of the parts shown in Fig. 3.

My invention relates to the proportional meters which are employed for determining the volume of fluid passing through a conduit or main, wherein a portion of the fluid is passed through a tally-meter, the present invention being an improvement upon the proportional meter described and claimed in my Patent No. 596,953 of January 4, 1898. The meter of that patent comprises oppositely acting pressure plates connected to each other and controlling the valves for the measured and unmeasured currents of fluid. The valve for the measured current of fluid delivered from the tally-meter was, in accordance with the construction shown in said patent, so placed with reference to the flow of the unmeasured currents of gas as to be affected by the deposit of dust or dirt carried by the gas. In these meters, the opening for the meter delivery valve is made such that its ratio to the area of the opening of the direct inlet valve shall be equal to the ratio of the determined capacity of the tally-meter and the volume of fluid passing to the direct delivery, so that under all degrees of opening of the direct delivery valve and the meter delivery valve, the proportionate delivery of the meter is constantly equal to the predetermined fraction of the supply volume with which the capacity of the tally-meter accords. It is therefore of the greatest importance to so arrange the meter delivery valve that neither its operation nor the effective area of the opening controlled by the valve can be changed by reason of accumulation of dust or dirt.

My present invention is designed to provide a novel arrangement of the meter in which the meter delivery valve is exposed only to the flow of the measured current of gas which has already passed through the tally-meter and has parted with most of its contained dirt before reaching the said valve. I also arrange the meter delivery valve, which is preferably of a special pivoted needle form, so that the flow of current shall be in the direction opposite the opening movement of the valve and shall sweep over the valve in a manner to free it from any accumulation of dirt.

In the accompanying drawings, in which I have shown the preferred arrangement of my invention, the numeral 2 designates the casing of the proportional meter having an inlet opening 3 at one end and an outlet opening 4 at the opposite end. The casing is divided interiorly by a partition 5, the space at one side of said partition forming the inlet chamber and the space at the opposite side of the partition forming the delivery chamber of the meter. The partition is formed with an opening 6, controlled by a valve 7, which seats in the direction of the flow of the fluid and which constitutes the high pressure plate of the meter. This high pressure plate or valve 7 is connected with the diaphragm 8, constituting the low pressure plate of the meter, through the bell crank lever 9 and rod 10.

The numeral 11 designates the tally-meter whose inlet side is connected by a pipe 12 with the inlet chamber of the proportional meter and whose delivery side is connected by a pipe 13 with a valve chamber 14, which communicates with the outlet chamber of the proportional meter through the valve-controlled opening 15.

16 is the meter delivery valve controlling the opening 15.

The chamber 14 is formed by a box 17, seated upon the casing 2, and having a vertical partition 18, through which the opening 15 is formed. The connection 13, leading from the delivery side of the tally-meter is shown as entering this box at one end and the box as having a bypass passage 19 at one side and leading around to the opposite side of the partition 18. The valve 16 is pivoted at 20, at the outer side of the partition 18, and has a tapering portion 21, which extends through and is adapted to regulate and control the opening 15. The inner end of the valve is connected by a link 22 with the upper arm of a pivoted lever 23. The lower arm of this lever has a link 24, connecting it with the stem of the direct inlet valve or high pressure plate 7.

The operation is as follows: The fluid entering at 3 passes through pipe 12 and the tally-meter and having passed through this meter flows through the pipe 13 into the box 14, and through the branch connection 13ª, provided for that purpose, into the chamber containing the diaphragm or low pressure plate 8, at the opposite side thereof from the connection to the high pressure plate. When sufficient pressure has accumulated in this diaphragm chamber to actuate the connections 9 and 10, the valve 7 is opened, and through the connections 22, 23 and 24, the valve 16 is proportionately opened. Some of the fluid now continues to flow through the tally-meter and the remainder directly through the proportional meter. The principle of operation and the manner in which the required proportional flow of fluid through the direct admission valve 7 and meter delivery valve 16 is at all times maintained is in all respects similar to that of my said patent and need not here be described.

It will be observed that not only is the meter delivery valve 16 placed so that it will not be affected by the unmeasured gas, but that it is also arranged so that the measured gas will flow past the valve in the direction opposed to the opening movement, and will sweep therefrom any dust or dirt which might tend to accumulate thereon.

I do not desire to limit myself to the precise construction and arrangement of the parts which I have herein shown and described, as it is obvious that they may be varied in detail in numerous ways, without departing from the spirit and scope of my invention, as defined in the appended claims.

I claim:

1. In a proportional meter, the combination with a direct inlet valve arranged to close in the direction of the current, said valve acting as a high pressure plate acted upon by the entering fluid, a diaphragm chamber containing a diaphragm forming a low pressure plate, a connection between the two plates, a tally-meter connected at one side to the inlet side of the meter apparatus and at the opposite side to the delivery chamber of the meter apparatus, the last named connection also communicating with the diaphragm chamber, and a valve controlling the last named connection, said valve opening in a direction opposed to the flow of gas past the valve, substantially as described.

2. In a proportional meter, a meter casing divided into inlet and delivery chambers, and a main valve controlling the communication between said chambers, of a tally-meter connected to the inlet chamber, a connection leading from the said delivery side of the tally-meter to the delivery chamber, a diaphragm chamber containing a diaphragm connected to the main valve, said chamber being also connected with the said delivery chamber of the tally-meter, and a valve controlling the flow of fluid from the tally-meter and diaphragm chamber into the delivery chamber, said valve being connected to the main inlet valve and arranged to open in a direction opposed to the flow of gas in said valve, substantially as described.

3. In a proportional meter, a meter casing divided into inlet and delivery chambers, a main inlet valve controlling the communication between said chambers, a tally-meter connected with the said inlet chamber, a valve box mounted upon the case over the said delivery chamber and communicating therewith, a connection from the delivery side of the tally-meter into said box, a valve pivoted within said box and controlling the flow of fluid through said box into the delivery chamber, said valve having an actuating connection with the main inlet valve and arranged to open in a direction opposed to the flow of gas past the valve, a diaphragm chamber also connected to the said box, a diaphragm therein, and a connection between the diaphragm and the main inlet valve, substantially as described.

4. A proportional meter having a delivery chamber, a valve box mounted thereon and communicating therewith, and a meter delivery valve pivoted in said box and controlling the flow of measured gas therethrough into the said delivery chamber, said valve being arranged to open in a direction opposed to the flow of gas, and a main valve controlling the flow of the unmeasured gas and having an actuating connection with the meter delivery valve, substantially as described.

In testimony whereof, I have hereunto set my hand.

THOMAS B. WYLIE.

Witnesses:
H. M. CORWIN,
GEO. H. PARMELEE.

---

Copies of this patent may be obtained for five cents each, by addressing the "Commissioner of Patents, Washington, D. C."